United States Patent
Branco

(10) Patent No.: US 10,185,633 B2
(45) Date of Patent: Jan. 22, 2019

(54) PROCESSOR STATE INTEGRITY PROTECTION USING HASH VERIFICATION

(71) Applicant: Intel Corporation, Santa Clara, CA (US)

(72) Inventor: Rodrigo R. Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 14/969,732

(22) Filed: Dec. 15, 2015

(65) Prior Publication Data
US 2017/0168902 A1    Jun. 15, 2017

(51) Int. Cl.
G06F 11/14 (2006.01)
G06F 11/00 (2006.01)

(52) U.S. Cl.
CPC ...... *G06F 11/1469* (2013.01); *G06F 11/1451* (2013.01); *G06F 2201/805* (2013.01); *G06F 2201/84* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,185,249 B2* | 2/2007 | Tkacik | ............ | G01R 31/31719 326/16 |
| 7,363,564 B2* | 4/2008 | Moss | ............ | G06F 21/74 326/16 |
| 7,761,759 B2* | 7/2010 | Yamazaki | ............ | G01R 31/31719 714/726 |
| 7,797,575 B2* | 9/2010 | Clark | ............ | G06F 1/04 714/11 |

(Continued)

FOREIGN PATENT DOCUMENTS

EP    2759955 A1    7/2014

OTHER PUBLICATIONS

International Search Report and Written Opinion issued in PCT Application No. PCT/US2016/061823, dated Feb. 7, 2017, 15 pages.

(Continued)

*Primary Examiner* — Amine Riad
(74) *Attorney, Agent, or Firm* — Grossman, Tucker, Perreault & Pfleger PLLC

(57) ABSTRACT

This disclosure is directed to processor state integrity protection using hash verification. A device may comprise processing circuitry and memory circuitry. The processing circuitry may be triggered to enter a secure mode. Prior to entering the secure mode, the processing circuitry may determine a processor state of the processing circuitry and a hash of the processor state, and store them in secured memory within the memory circuitry. Prior to exiting the (Continued)

secure mode, the processing circuitry may compute an updated hash of the stored processor state and compare it to the previously stored hash. If the updated hash and stored hash are determined to be the same, then the processing circuitry may restore the processor state and normal operation resumes. If the updated hash and stored hash are determined to be different, then the stored processor state may be compromised and the processing circuitry may perform at least one protective action.

15 Claims, 3 Drawing Sheets

(56) References Cited

U.S. PATENT DOCUMENTS

| | | | | |
|---|---|---|---|---|
| 8,140,893 | B2* | 3/2012 | Niino | G06F 11/1645 714/11 |
| 8,739,861 | B2* | 6/2014 | Hughes | E21B 17/028 166/378 |
| 8,930,753 | B2* | 1/2015 | Hillman | G06F 11/073 714/10 |
| 9,418,027 | B2* | 8/2016 | Hadley | G06F 21/54 |
| 2002/0065978 | A1* | 5/2002 | Mattison | G06F 12/1408 711/1 |
| 2006/0020850 | A1* | 1/2006 | Jardine | G06F 11/1004 714/11 |
| 2009/0144582 | A1 | 6/2009 | Li et al. | |
| 2009/0292894 | A1 | 11/2009 | Henry et al. | |
| 2010/0281273 | A1 | 11/2010 | Lee et al. | |
| 2012/0117419 | A1 | 5/2012 | Hillman et al. | |
| 2014/0082724 | A1* | 3/2014 | Pearson | G06F 21/575 726/22 |
| 2014/0123320 | A1* | 5/2014 | Isozaki | G06F 21/44 726/29 |
| 2017/0060936 | A1* | 3/2017 | Gammans | G06F 17/30176 |

OTHER PUBLICATIONS

Duflot, et al., "Using CPU Management Mode to Circumvent Operation System Security Functions", DCSSI 51 bd. De la Tour Maubourg 75700 Paris Cedex 07 France, LRI, Universite de Paris Sud, 91405 Orsay France, 2006, downloaded from www.cs.usfca.edu/~cruse/cs630f06/duflot.pdf, Mar. 30, 2016.

Branco, et al., "Using System Management Mode for Other Purposes", 2007, downloaded from http://phrack.org/issues/65/7.html., Mar. 30, 2016.

Wecherowski, Filip, "A Real SMM Rootkit: Reversing and Hooking BIOS SMI Handlers", 2009, downloaded from http://phrack.org/issues/66/11.html., Mar. 30, 2016.

Furtak, et al., "A New Class of Vulnerabilities in SMI Handlers", CanSecWest 2015, Vancouver, Canada, 2015.

* cited by examiner

PROCESSOR STATE INTEGRITY PROTECTION USING HASH VERIFICATION

TECHNICAL FIELD

The present disclosure relates to system security, and more particularly, to verifying the integrity of a processor state prior to restoration upon exiting system management mode (SMM).

BACKGROUND

The protection of device and data integrity has become essential as common interactions are increasingly performed via electronic communication. For example, users may execute data and financial transactions, business-related transactions, etc. utilizing electronic communication. In these interactions confidential information may be transmitted to other devices in a network such as a global area network (GAN), a wide area network (WAN) like the Internet, a local area network (LAN). Confidential information may also be received from other devices in a network and stored on a user's device. As a result, devices may comprise confidential information for the user of the device and possibly other users. Over time the confidential information may grow to include personal identification data, medical/health data, financial data, residence data, account numbers, passwords, professional information such as registration/license data, office location, contact data, client data, etc. Certain attackers having possibly malicious intent may desire to obtain this type of information to utilize for their own benefit, sell to others, etc.

The increasing threat to both devices and data has driven continual security improvement. However, as new protections emerge attackers devise creative ways to overcome them. Designers attempt to combat these new breaches with even more impregnable defenses. For example, some devices may include processing circuitry that may operate in a secure mode for brief periods of time. The secure mode may be privileged so that only the processing circuitry may operate, and thus, all other activity in the device is suspended. To help ensure that the device may seamlessly return to a normal mode of operation, the "state" of a microprocessor in the processing circuitry may be saved upon entering the secure mode, and may be restored just prior to returning to the normal mode. The state may include, for example, the values of registers, variables, etc. used by the processing circuitry, pointers to memory locations, etc. While the state may be stored in a secured memory location, it has been determined recently that an attacker's ability to flip even one bit in the state could change the operation of the processing circuitry when the state is restored. The bit could put the processing circuitry into a vulnerable mode that may allow an attacker to edit, delete or insert data, or to otherwise manipulate the processing circuitry to obtain remote control over some of, or the entirety of, the device, access valuable information stored in the device, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
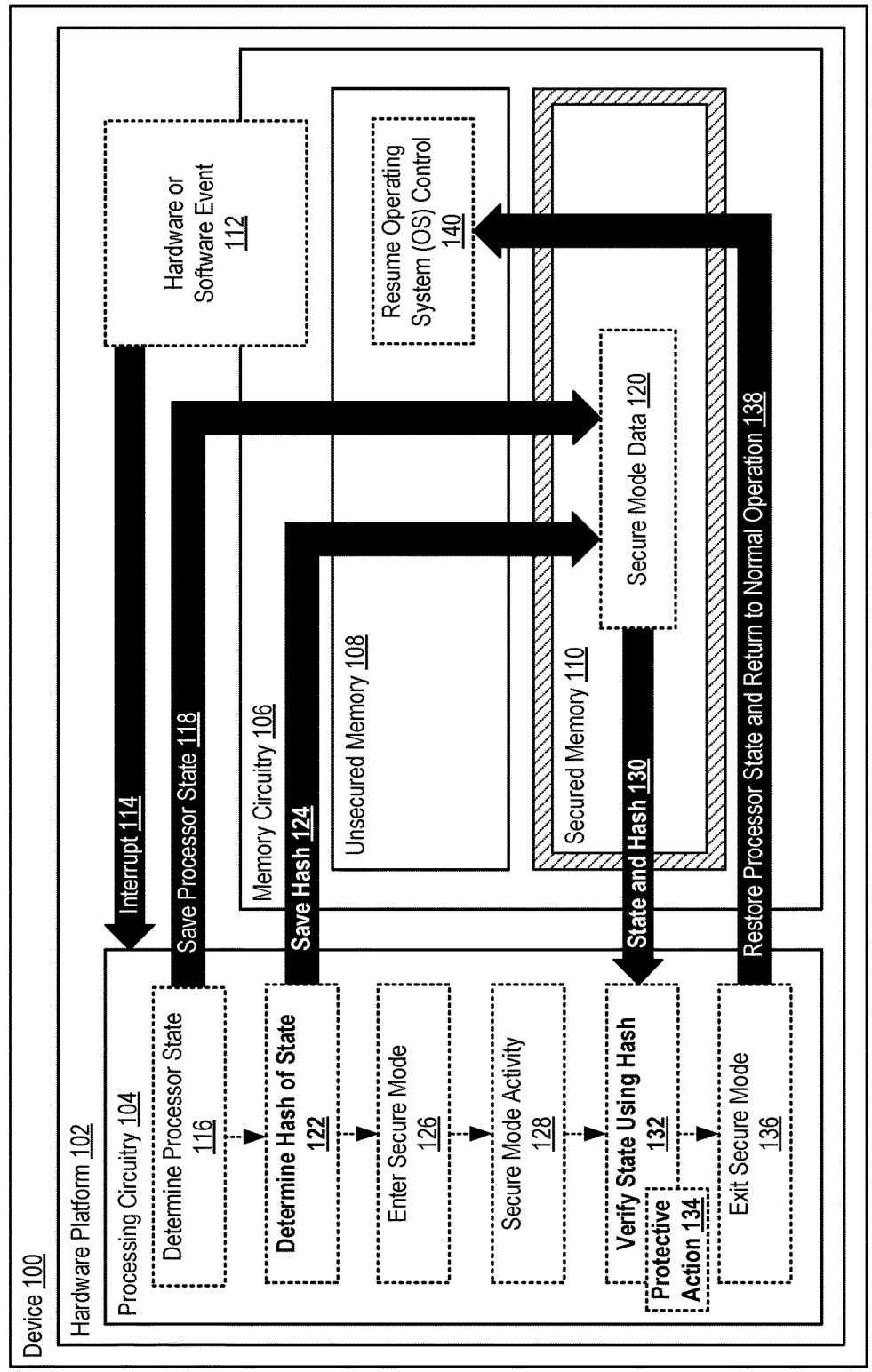
FIG. 1 illustrates an example device configured for processor state integrity protection using hash verification in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to processor state integrity protection using hash verification. A device may comprise processing circuitry and memory circuitry. The processing circuitry may be triggered to enter a secure mode (e.g., by an interrupt). Prior to entering the secure mode, the processing circuitry may determine a processor state of the processing circuitry and a hash of the processor state, and store the processor state and the hash in secured memory within the memory circuitry. In the secure mode the processing circuitry may perform at least one activity (e.g., that may correspond to the interrupt). Prior to exiting the secure mode to return to a normal mode of operation, the processing circuitry may compute an updated hash of the stored processor state and compare it to the previously stored hash. If the updated hash is determined to be the same as the stored hash, the processing circuitry may proceed to restore the processor state and normal operation may resume. If the updated hash and the stored hash are determined to be different, then the stored processor state may be compromised (e.g., altered by malware, an attacker, etc.). The processing circuitry may proceed to perform one or more protective actions comprising, for example, increasing security in the device, deactivating the device, generating a notification, etc.

In at least one embodiment, a device capable of ensuring processor state integrity may comprise, for example, at least memory circuitry and processing circuitry. The memory circuitry may include at least a secured memory in which a processor state and a hash of the processor state is stored. The processing circuitry may be to, while operating in a secure mode, generate an updated hash of the stored processor state, determine if the updated hash is the same as the stored hash and restore the processor state if the updated hash is determined to be the same as the stored hash.

In at least one embodiment, the secure mode may be system management mode (SMM). The secured memory region may, for example, only be accessible to the processing circuitry, and only when the processing circuitry is in the secure mode. The processing circuitry may be to enter the secure mode based on an interrupt triggered by an event occurring in the device. The processing circuitry may further be to determine the processor state and store the processor state in the secured memory prior to entering the secure mode. The processing circuitry may further be to determine the hash of the stored processor state and store the hash in the secured memory prior to entering the secure mode.

In at least one embodiment, the processing circuitry may be to exit the secure mode after restoring the processor state. The processing circuitry may further be to execute at least one protective action if the updated hash is determined not to be the same as the stored hash. In executing the at least one protective action the processing circuitry may further be to at least one of increase device security, deactivate the device or generate a notification. An example method for ensuring processor state integrity may comprise operating in a secure mode in a device, generating an updated hash of a processor state stored in a secured memory of memory circuitry in the device, determining if the updated hash is the same as a hash stored in the secured memory and restoring the processor state if the updated hash is determined to be the same as the stored hash.

FIG. 1 illustrates an example device configured for processor state integrity protection using hash verification in accordance with at least one embodiment of the present disclosure. Various implementations presented herein may employ technologies such as, but not limited to, SMM, hashing, etc. The technologies are not intended to be limiting, and are offered merely as readily comprehensible examples from which the disclosed apparatuses, systems, methodologies, etc. may be understood. In addition, the inclusion of an apostrophe after an item number in a drawing figure (e.g., 100') indicates that an example embodiment of the particular item is being illustrated. These example embodiments are not intended to limit the present disclosure to only what is shown in the figure, and have been presented herein merely for the sake of explanation. As generally referenced herein, system management mode (SMM) may be an operational mode wherein normal execution is temporarily suspended and certain "safe" software (e.g., a firmware runtime application, a hardware-assisted interpreter and/or debugger, etc.) may be executed at a high privilege level. SMM may only be entered through a system management interrupt (SMI), and is generally a mode of operation in which operations may be performed without interruption or interference from other resources such as utilities, drivers, an operating system (OS), etc. In addition, hashing, as generally referenced herein may be a cryptographic function that analyzes the contents of a program, data file, etc., and then generates a value based on the contents. The value is specific to the contents, and thus when the contents change the hash value also changes.

Device 100 is illustrated in FIG. 1. While device 100 is depicted as a single device, two or more devices may together perform the operations that will be described in regard to FIG. 1. For example, a device acting as a user interface (e.g., wearable device) may be able to operate collaboratively with a device operating as a data processor (e.g., a mobile device). Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

As illustrated in FIG. 1, device 100 may comprise, for example, hardware platform 102. Hardware platform 102 may include any components, modules, circuitry, buses, etc. that may be required to support the operation of device 100. For example, hardware platform may include at least processing circuitry 104 and memory circuitry 106. Processing circuitry 104 may generally perform data processing in device 100, but may be transformed from a general data processor to specialized circuitry through instructions provided by code (e.g., a program, application, utility or other programmatic construct). Memory circuitry 106 may comprise, for example, unsecured memory 108 and secured memory 110. Unsecured memory 108 may comprise memory in which lower privilege programs may execute such as an OS and any supporting software, applications, utilities, etc. Secured memory 110 may be a memory location in memory circuitry 106 that may only be accessible by processing circuitry 104 when operating in a secure mode. In the instance where processing circuitry 104 has the ability to enter SMM (e.g., in response to the occurrence of an SMI), secured memory 110 may include at least one System Management Random Access Memory (SMRAM) to store that is accessible to processing circuitry 104 only while in SMM.

In general, secured memory 110 may comprise the state of execution of processing circuitry 104 (e.g., of at least one microprocessor within processing circuitry 104) at the time of interrupt. Interrupt handlers have the ability to relocate the stored state data and also to change the saved state, which may alter the return point of an execution on a return from secure mode instruction (e.g., in the instance of SMM this is a "Return from SMM" instruction or "RSM"). Technology exists to prevent exploitation of Interrupt handlers. In the instance of Intel Xeon® processors these protections are called SMM External Call Traps. The purpose of the External Call Traps technology is to inhibit an SMI handler from creating an instruction to fetch outside of the SMRAM. However, at least one problem is that ability to relocate data coupled with the saving the processor state and controlling the return point are per se Turing complete (e.g., form a complete and functional computing environment), and thus, are a very powerful programming environment. It has already been demonstrated that the relocation capability may be employed to completely and generically bypass the External Code Traps protection.

Consistent with the present disclosure, integrity checking of elements in the saved state area, either through shadowing of the values or through hashing, may be employed to protect against restoring a state that may be compromised (e.g., who data may have been altered). To successfully exploit SMI handler vulnerability an attacker must successfully perform an arbitrary write into the SMRAM area. With the write it may be possible to generically bypass the External Code Traps protection even if that write primitive is very limited. For example, given the known vulnerabilities in SMM it was only possible for an attacker to write a value of 0 to the SMRAM. The attacker may then utilize the relocation capability of SMM to force the stored processor state to be relocated in a different memory range where the attacker has control to leverage the attack.

In at least one embodiment, the above attack may be thwarted through integrity checks of the contents of secured memory 110 performed once an instruction is executed to exit the secure mode. Some integrity checks are already performed to check for malfunction, which may result in a global shutdown of device 100. However, utilizing hashing to check SMRAM contents may allow the integrity of the entire saved state (e.g., about 700 bytes) to be verified. A disadvantage to hash-based integrity checking is the additional time that may be required for hash processing to be performed (e.g., upon entrance and exit of the secure mode). However, this delay may be mitigated in that some existing checks may be removed as being duplicative of the protection provided by hash-based integrity checking. Employing a hash to verify the saved state may kill an entire class of exploits for interrupt handlers, making it virtually impossible for an attacker to alter elements in the saved state area. Changes to BIOS code may not be required as hash-based integrity checking may be completely transparent to current SMI handlers. Hash-based integrity checking may also be deactivated for certain end users such as, for example, original equipment manufacturers (OEMs). For example, a model-specific register (MSR) may be used to enable, lock, etc. hash-based integrity checks so that an incompatible BIOS may opt-out. Since hash-based integrity checking is to prevent vulnerabilities from being exploited, attackers still don't have the ability to execute code. Thus even weak hash algorithms may suffice since the attacker would probably not have multiple write opportunities to fix the entire space. However, strong hash algorithms may be recommended because some vulnerabilities existing now or discovered in the future might provide execution ability to the attacker. The saved state area is only around 700 bytes. The hash result may be stored in the saved state area (e.g., secured memory 110). For example, in existing SMM the saved state area has enough reserved areas that are currently not in use to accommodate the hash result, and also has the capability of having read-only areas.

An example of operation is also illustrated in FIG. 1. Hardware and/or software events may occur during the normal operation of device 100 as shown at 112. A hardware event may originate in, for example, an integrated circuit (IC), chipset, motherboard, peripheral add-on, etc. A software event may be generated by the OS, an application, utility, etc. The event may trigger the generation of interrupt 114. In an implementation where processing circuitry 104 is equipped with SMM, interrupt 114 may be an SMI. Prior to entering secure mode, the state of processing circuitry 104 (e.g., of at least one microprocessor in processing circuitry 104) may be determined as shown at 116, and then stored in secured memory 110 as shown at 118 (e.g., as secure mode data 120). A hash may then be determined based on the stored processor state as shown at 122, and the hash may be stored along with the processor state as shown at 124. Processing circuitry 104 may then enter secure mode as shown at 126 and may proceed to perform whatever activity that is required to be completed in secure mode as shown at 128. For example, the activity may be whatever was required by the hardware or software event as shown at 112 (e.g., that triggered interrupt 114) and could not otherwise be completed during normal operation of device 100.

Following completion of the activity as shown at 128, processing circuitry 104 may then retrieve the stored processor state and stored hash as shown at 130 and may then verify the state using the hash as shown at 132. Verifying the stored processor state may comprise, for example, comparing an updated hash generated based on the stored processor state to the stored hash. If the updated hash is determined to be different than the stored hash, then secure mode data 122 may be compromised (e.g., possibly altered by malware, hacking, etc.). At least one protective action may then be performed as shown at 134. Example protection actions may include, but are not limited to, increasing a level of security in device 100 (e.g., encrypting data, moving data to secured memory, requiring passwords or keys, etc.), deactivating device 100, generating a notification (e.g., generating a visible or audible notification informing the user of device 100 of an error, a possible security situation, etc.), etc. If the updated hash is determined to be the same as the stored hash, then processing circuitry 104 may exit secure mode as shown at 136. Exiting secure mode may involve, for example, initially restoring the processor state as shown at 138 and returning to normal device operation (e.g., resuming OS control of the device) as shown at 140.

Figure 2:
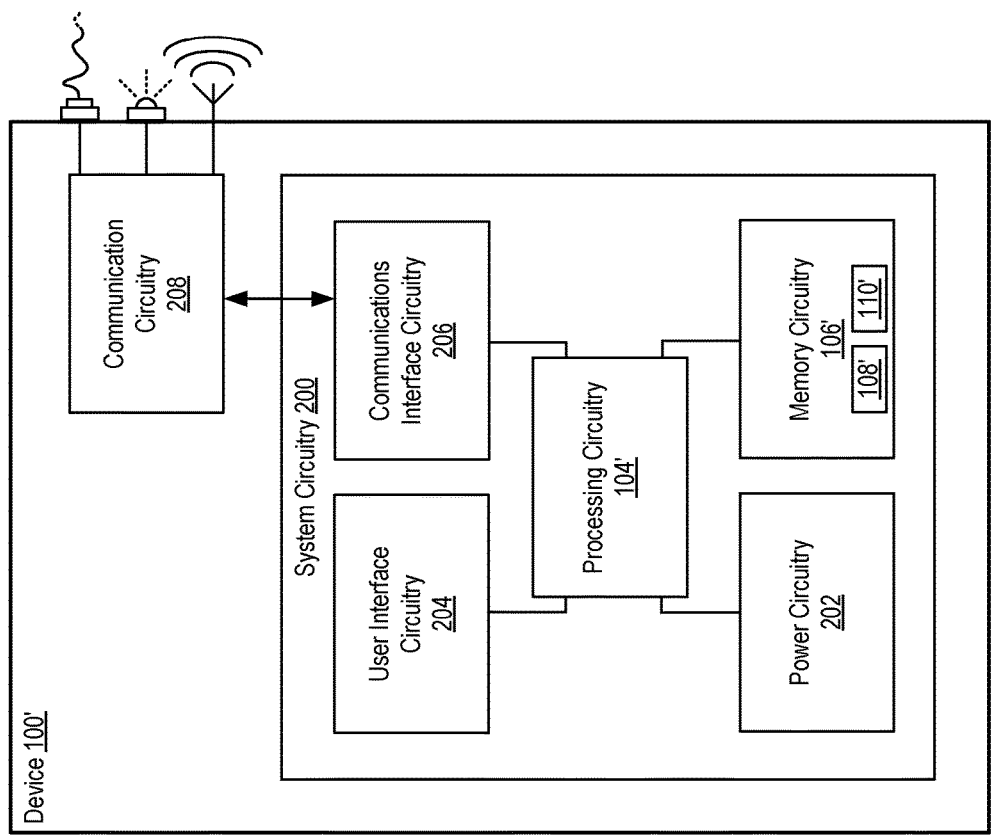
FIG. 2 illustrates an example configuration for a device usable in accordance with at least one embodiment of the present disclosure.

FIG. 2 illustrates an example configuration for a device usable in accordance with at least one embodiment of the present disclosure. Device 100' may be capable of performing any or all of the activities illustrated in FIG. 1. However, device 100' is presented only as an example of an apparatus usable in embodiments consistent with the present disclosure, and is not intended to limit any of the embodiments to any particular manner of configuration, implementation, etc.

Device 100' may comprise at least system circuitry 200 to manage device operation. Example system circuitry 200 may include processing circuitry 104', memory circuitry 106', power circuitry 202, user interface circuitry 204 and communications interface circuitry 206. Device 100' may further include communication circuitry 208. While communication circuitry 208 is shown as separate from system circuitry 200, the example configuration of device 100' has been provided herein merely for the sake of explanation. Some or all of the functionality associated with communication circuitry 208 may also be incorporated into system circuitry 200.

In device 100', processing circuitry 104' may comprise one or more processors situated in separate components, or alternatively one or more processing cores situated in one component (e.g., in an SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. Examples of support circuitry may include chipsets (e.g., Northbridge, Southbridge, etc. available from the Intel Corporation) configured to provide an interface via which processing circuitry 104' may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing circuitry 104' may be configured to execute various instructions in device 100'. Instructions may include program code configured to cause processing circuitry 104' to perform activities related to reading data, writing data, processing data, formulating data, converting data, transforming data, etc. Information (e.g., instructions, data, etc.) may be stored in memory circuitry 106'. Memory circuitry 106' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other examples of fixed/removable memory may include, but are not limited to, magnetic memories such as hard disk (HD) drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 204 may be incorporated within device 100' and/or may be coupled to device 100' via a wired or wireless communication medium. In an example implementation wherein device 100' is a multiple device system, user interface circuitry 204 may be optional in devices such as, for example, servers (e.g., rack/blade servers, etc.) that omit user interface circuitry 204 and instead rely on another device (e.g., an operator terminal) for user interface functionality.

Communications interface circuitry 206 may be configured to manage packet routing and other functionality for communication circuitry 208, which may include resources configured to support wired and/or wireless communications. In some instances, device 100' may comprise more than one set of communication circuitry 208 (e.g., including separate physical interface circuitry for wired protocols and/or wireless radios) managed by communications interface circuitry 206. Wired communications may include serial and parallel wired or optical mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound waves, lasers, etc. In one embodiment, communications interface circuitry 206 may be configured to prevent wireless communications that are active in communication circuitry 208 from interfering with each other. In performing this function, communications interface circuitry 206 may schedule activities for communication circuitry 208 based on, for example, the relative priority of messages awaiting transmission. While the embodiment disclosed in FIG. 2 illustrates communications interface circuitry 206 being separate from communication circuitry 208, it may also be possible for the functionality of communications interface circuitry 206 and communication circuitry 208 to be incorporated into the same circuitry.

Consistent with the present disclosure, unsecured memory 108' and secured memory 110' may reside in memory circuitry 106'. In an example of operation, processing circuitry 104' may receive interrupts triggered by the software executing in unsecured memory 108' including, for example, an OS, applications, utilities, etc., and may receive hardware interrupts from any or all of the circuitries 202 to 208 as illustrated in FIG. 2. After entering the secure mode, processing circuitry 104' may store at least a processor state and a hash of the processor state within secured memory 110' and may then retrieve this data when checking the integrity of the stored processor state. Processing circuitry 104' may also interact with hardware and/or software in device 100' when performing at least one protective measure (e.g., when the updated hash and stored hash are determined to be different). For example, device 100' may interact with at least memory circuitry 106' to increase a level of security in device 100', with at least power circuitry 202 to deactivate device 100', with at least user interface circuitry 204 to generate a notification, etc.

Figure 3:
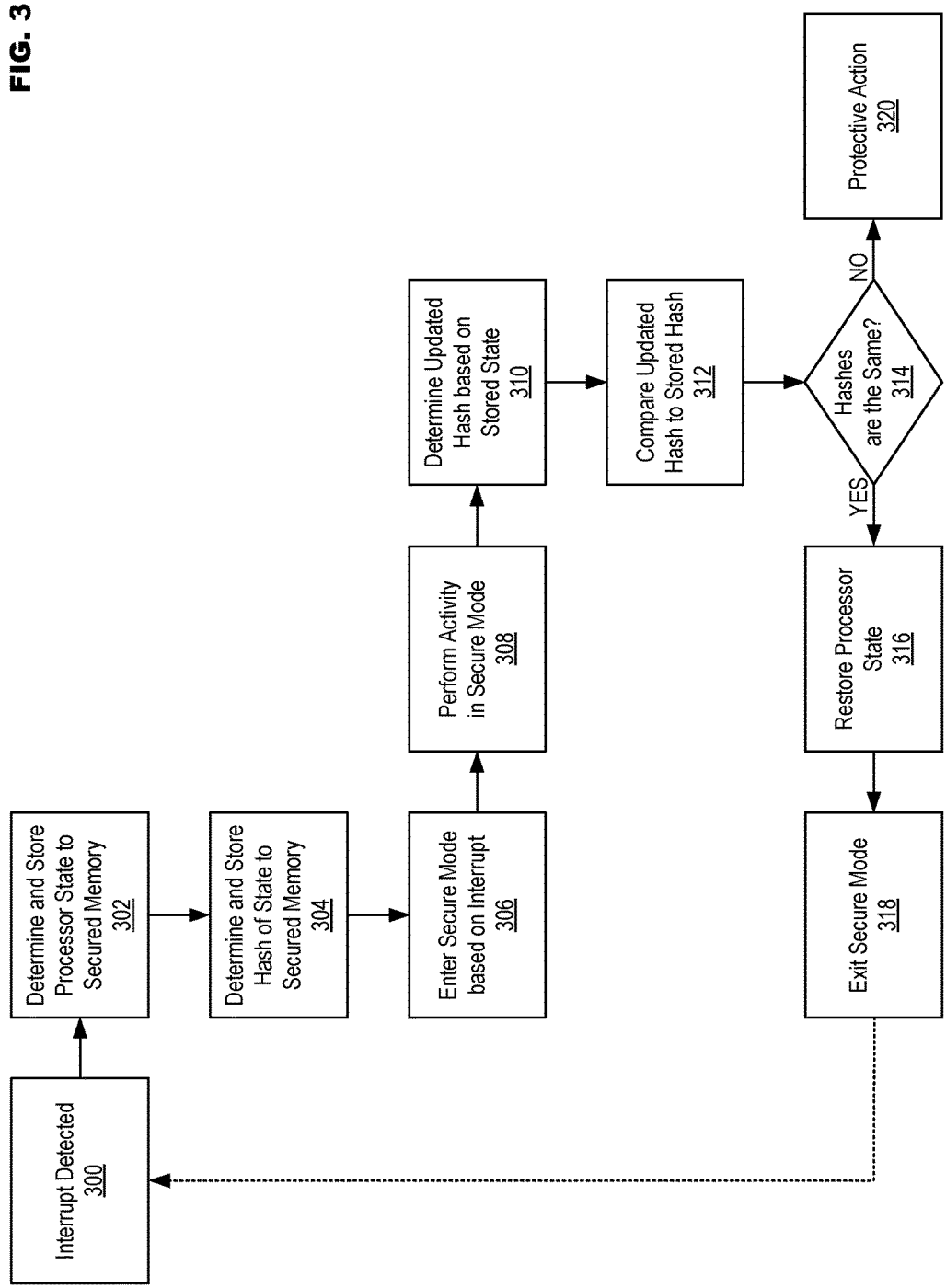
FIG. 3 illustrates example operations for processor state integrity protection using hash verification in accordance with at least one embodiment of the present disclosure.

FIG. 3 illustrates example operations for processor state integrity protection using hash verification in accordance with at least one embodiment of the present disclosure. An interrupt may be detected in operation 300 and handled by processing circuitry in a device. The interrupt may be generated by, for example, a hardware or software event in the device. A processor state may be determined and stored to secured memory in the device in operation 302, followed by the determination and storage of a hash of the stored processor state in operation 304. In operation 306 the processing circuitry may enter secure mode (e.g., SMM) in response to the interrupt that was detected in operation 300. The processing circuitry may perform at least one activity in the secure mode in operation 308. For example, the at least one activity may correspond to why the processing circuitry was triggered to enter the secure mode by the interrupt detected in operation 300. In operation 310 an updated hash may be determined based on the processor state stored in the secured memory. The updated hash may be compared to the stored hash in operation 312. A determination may be made in operation 314 as to whether the updated hash is the same as the stored hash. If in operation 314 it is determined that he updated hash is the same as the stored has, then in operation 316 the processor state may be restored and the processing circuitry may exit the secure mode in operation 318. Operation 318 may optionally be followed by a return to operation 300 to, for example, prepare for further interrupts to be detected. If in operation 314 it is determined that the updated hash is different from the stored hash, then in operation 320 at least one protective action may be performed. Example protective actions may include, but are not limited to, increasing device security, deactivating the device, generating a notification, etc.

While FIG. 3 illustrates operations according to an embodiment, it is to be understood that not all of the operations depicted in FIG. 3 are necessary for other embodiments. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, this disclosure is directed to processor state integrity protection using hash verification. A device may comprise processing circuitry and memory circuitry. The processing circuitry may be triggered to enter a secure mode. Prior to entering the secure mode, the processing circuitry may determine a processor state of the processing circuitry and a hash of the processor state, and store them in secured memory within the memory circuitry. Prior to exiting the secure mode, the processing circuitry may compute an updated hash of the stored processor state and compare it to the previously stored hash. If the updated hash and stored hash are determined to be the same, then the processing circuitry may restore the processor state and normal operation resumes. If the updated hash and stored hash are determined to be different, then the stored processor state may be compromised and the processing circuitry may perform at least one protective action.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for processor state integrity protection using hash verification.

According to example 1 there is provided a device capable of ensuring processor state integrity. The device may comprise memory circuitry including at least a secured memory in which a processor state and a hash of the processor state is stored and processing circuitry to, while operating in a secure mode, generate an updated hash of the stored processor state, determine if the updated hash is the same as the stored hash and restore the processor state if the updated hash is determined to be the same as the stored hash.

Example 2 may include the elements of example 1, wherein the secure mode is system management mode.

Example 3 may include the elements of any of examples 1 to 2, wherein the secured memory is system management random access memory (SMRAM).

Example 4 may include the elements of any of examples 1 to 3, wherein the secured memory region is only accessible to the processing circuitry, and only when the processing circuitry is in the secure mode.

Example 5 may include the elements of any of examples 1 to 4, wherein the processing circuitry is to enter the secure mode based on an interrupt triggered by an event occurring in the device.

Example 6 may include the elements of example 5, wherein the processing circuitry is to determine the processor state and store the processor state in the secured memory prior to entering the secure mode.

Example 7 may include the elements of example 6, wherein the processing circuitry is to determine the hash of the stored processor state and store the hash in the secured memory prior to entering the secure mode.

Example 8 may include the elements of any of examples 5 to 7, wherein the processing circuitry is to determine the processor state, store the processor state in the secured memory, determine the hash of the stored processor state and store the hash in the secured memory all prior to entering the secure mode.

Example 9 may include the elements of any of examples 1 to 8, wherein the processing circuitry is to exit the secure mode after restoring the processor state.

Example 10 may include the elements of example 9, wherein the processing circuitry is to return control of the device to an operating system in the device after exiting the secure mode.

Example 11 may include the elements of any of examples 1 to 10, wherein the processing circuitry is to execute at least one protective action if the updated hash is determined not to be the same as the stored hash.

Example 12 may include the elements of example 11, wherein in executing the at least one protective action the processing circuitry is to at least one of increase security in the device, deactivate the device or generate a notification.

According to example 13 there is provided a method for ensuring processor state integrity. The method may comprise operating in a secure mode in a device, generating an updated hash of a processor state stored in a secured memory of memory circuitry in the device, determining if the updated hash is the same as a hash stored in the secured memory and restoring the processor state if the updated hash is determined to be the same as the stored hash.

Example 14 may include the elements of example 13, wherein the secure mode is system management mode.

Example 15 may include the elements of any of examples 13 to 14, wherein the secured memory is system management random access memory (SMRAM).

Example 16 may include the elements of any of examples 13 to 15, and may further comprise entering the secure mode based on an interrupt triggered by an event occurring in the device.

Example 17 may include the elements of example 16, and may further comprise determining the processor state and storing the processor state in the secured memory prior to entering the secure mode.

Example 18 may include the elements of example 17, and may further comprise determining the hash of the stored processor state and storing the hash in the secured memory prior to entering the secure mode.

Example 19 may include the elements of any of examples 16 to 18, and may further comprise determining the processor state, storing the processor state in the secured memory, determining the hash of the stored processor state and storing the hash in the secured memory all prior to entering the secure mode.

Example 20 may include the elements of any of examples 13 to 19, and may further comprise exiting the secure mode after restoring the processor state.

Example 21 may include the elements of example 20, and may further comprise returning control of the device to an operating system in the device after exiting the secure mode.

Example 22 may include the elements of any of examples 13 to 21, and may further comprise executing at least one protective action if the updated hash is determined not to be the same as the stored hash.

Example 23 may include the elements of example 22, wherein executing the at least one protective action comprises at least one of increasing security in the device, deactivating the device or generating a notification.

According to example 24 there is provided a system including at least one device, the system being arranged to perform the method of any of the above examples 13 to 23.

According to example 25 there is provided a chipset arranged to perform the method of any of the above examples 13 to 23.

According to example 26 there is provided at least one machine readable medium comprising a plurality of instructions that, in response to be being executed on a computing device, cause the computing device to carry out the method according to any of the above examples 13 to 23.

According toe example 27 there is provided at least one device capable of ensuring processor state integrity, the at least one device being arranged to perform the method of any of the above examples 13 to 23.

According to example 28 there is provided a system for ensuring processor state integrity. The system may comprise means for operating in a secure mode in a device, means for generating an updated hash of a processor state stored in a secured memory of memory circuitry in the device, means for determining if the updated hash is the same as a hash stored in the secured memory and means for restoring the processor state if the updated hash is determined to be the same as the stored hash.

Example 29 may include the elements of example 28, wherein the secure mode is system management mode.

Example 30 may include the elements of any of examples 28 to 29, wherein the secured memory is system management random access memory (SMRAM).

Example 31 may include the elements of any of examples 28 to 30, and may further comprise means for entering the secure mode based on an interrupt triggered by an event occurring in the device.

Example 32 may include the elements of example 31, and may further comprise means for determining the processor state and means for storing the processor state in the secured memory prior to entering the secure mode.

Example 33 may include the elements of example 32, and may further comprise means for determining the hash of the stored processor state and means for storing the hash in the secured memory prior to entering the secure mode.

Example 34 may include the elements of any of examples 31 to 33, and may further comprise means for determining the processor state, means for storing the processor state in the secured memory, means for determining the hash of the stored processor state and means for storing the hash in the secured memory all prior to entering the secure mode.

Example 35 may include the elements of any of examples 28 to 34, and may further comprise means for exiting the secure mode after restoring the processor state.

Example 36 may include the elements of example 35, and may further comprise means for returning control of the device to an operating system in the device after exiting the secure mode.

Example 37 may include the elements of any of examples 28 to 36, and may further comprise means for executing at least one protective action if the updated hash is determined not to be the same as the stored hash.

Example 38 may include the elements of example 37, wherein the means for executing the at least one protective action comprise means for at least one of increasing security in the device, deactivating the device or generating a notification.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A hardware device to ensure processor state integrity, comprising:

memory circuitry including at least a secured memory in which a processor state and a hash of the processor state is stored; and processing circuitry to enter a secure mode based on an interrupt triggered by an event occurring in the device and, while operating in the secure mode: generate an updated hash of the stored processor state, determine if the updated hash is the same as the stored hash, restore the processor state if the updated hash is determined to be the same as the stored hash and execute, responsive to a determination that the updated hash is not the same as the stored hash, at least one protective action that includes increasing security in the device;

wherein the secured memory region is only accessible to the processing circuitry, and only when the processing circuitry is in the secure mode.

2. The device of claim 1, wherein the processing circuitry is to determine the processor state and store the processor state in the secured memory prior to entering the secure mode.

3. The device of claim 2, wherein the processing circuitry is to determine the hash of the stored processor state and store the hash in the secured memory prior to entering the secure mode.

4. The device of claim 1, wherein the processing circuitry is to exit the secure mode after restoring the processor state.

5. The device of claim 1, wherein the at least one protective action further includes one or more of deactivating the device or generating a notification.

6. A method to ensure processor state integrity, comprising:

initiating, based at least in part on an interrupt triggered by an event occurring in a hardware device, a system management mode in the hardware device that includes processing circuitry and memory circuitry, the memory circuitry including a secured memory region that is accessible only to the processing circuitry and only when the processing circuitry operates in the system management mode;

generating an updated hash of a processor state, the processor state being stored in a secured memory region of the memory circuitry in the hardware device;

determining whether the updated hash is the same as a hash stored in the secured memory region;

restoring the processor state responsive to determining that the updated hash is the same as the stored hash; and executing, responsive to determining that the updated hash is not the same as the stored hash, at least one protective action that includes increasing security in the hardware device.

7. The method of claim 6, further comprising:
determining the processor state; and
storing the processor state in the secured memory region prior to entering the system management mode.

8. The method of claim 7, further comprising:
determining the hash of the stored processor state; and
storing the hash in the secured memory region prior to entering the system management mode.

9. The method of claim 6, further comprising:
exiting the system management mode after restoring the processor state.

10. The method of claim 6, wherein executing the at least one protective action comprises at least one of deactivating the device or generating a notification.

11. At least one machine-readable storage medium having stored thereon, individually or in combination, instructions to ensure processor state integrity that, when executed by one or more processors, cause the one or more processors to:

initiate, based on an interrupt triggered by an event occurring in a hardware device, a secure mode in the hardware device;

generate an updated hash of a processor state, wherein the processor state is stored in a secured memory region of memory circuitry in the device, and wherein the secured memory region is accessible only to processing circuitry of the hardware device and only when the processing circuitry operates in the secure mode;

determine if the updated hash is the same as a hash stored in the secured memory;

restore the processor state if the updated hash is determined to be the same as the stored hash; and execute at least one protective action, including at least to increase security in the device, if the updated hash is determined not to be the same as the stored hash.

12. The storage medium of claim 11, further comprising instructions that, when executed by one or more processors, cause the one or more processors to:
determine the processor state; and
store the processor state in the secured memory region prior to initiating the secure mode.

13. The storage medium of claim 12, further comprising instructions that, when executed by one or more processors, cause the one or more processors to:
determine the hash of the stored processor state; and
store the hash in the secured memory region prior to entering the secure mode.

14. The storage medium of claim 11, further comprising instructions that, when executed by one or more processors, cause the one or more processors to:
exit the secure mode after restoring the processor state.

15. The storage medium of claim 11, wherein the instructions to execute the at least one protective action comprise instructions to deactivate the device and/or generate a notification.

* * * * *